(No Model.)  11 Sheets—Sheet 1.

W. F. BANKS.
ELECTRICAL SIGNALING SYSTEM AND APPARATUS.

No. 604,712.  Patented May 31, 1898.

WITNESSES  INVENTOR
Gustave Dieterich  Walter F. Banks,
Fed. E. Morse  BY Briesen & Knauth
 his ATTORNEYS.

(No Model.) 11 Sheets—Sheet 2.

W. F. BANKS.
ELECTRICAL SIGNALING SYSTEM AND APPARATUS.

No. 604,712. Patented May 31, 1898.

WITNESSES: Gustave Dieterich

INVENTOR Walter F. Banks,
BY Briesen & Knauth
his ATTORNEYS.

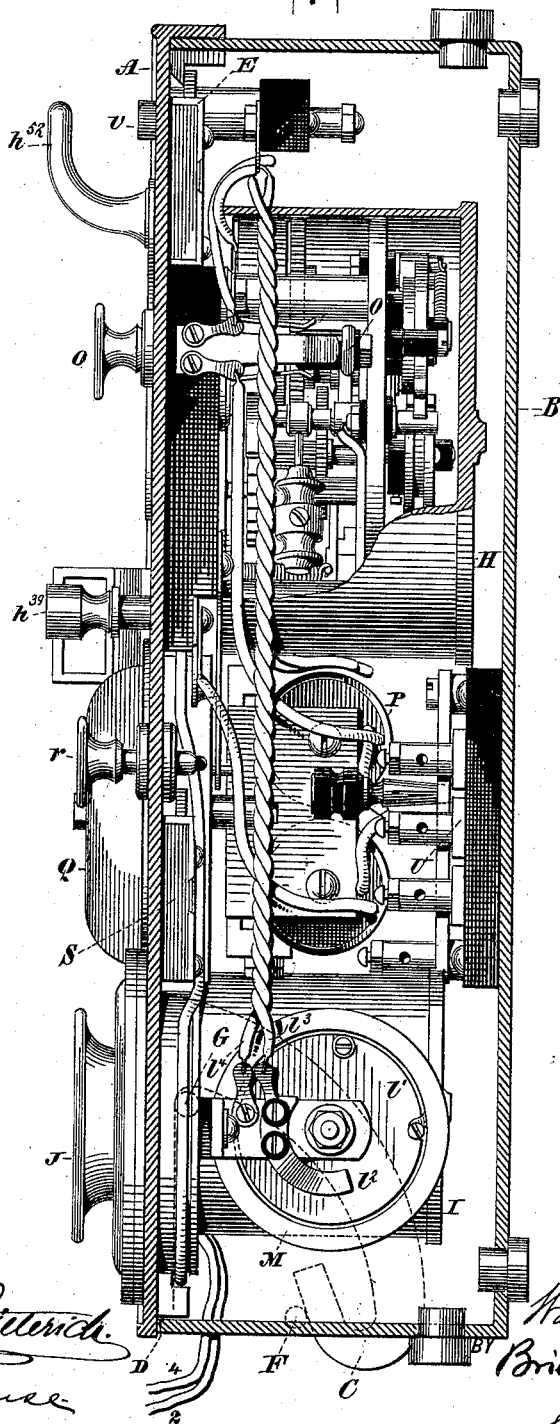

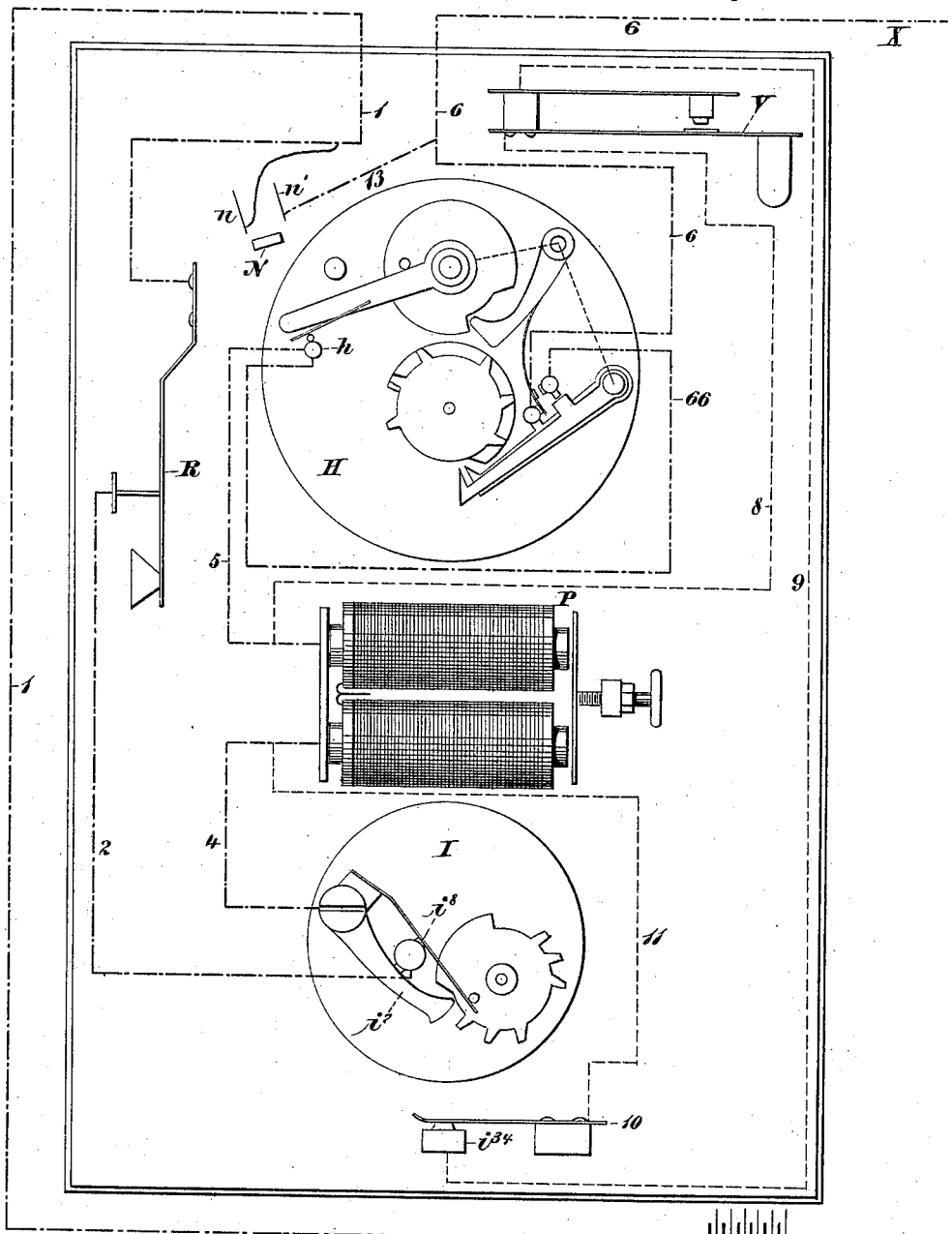

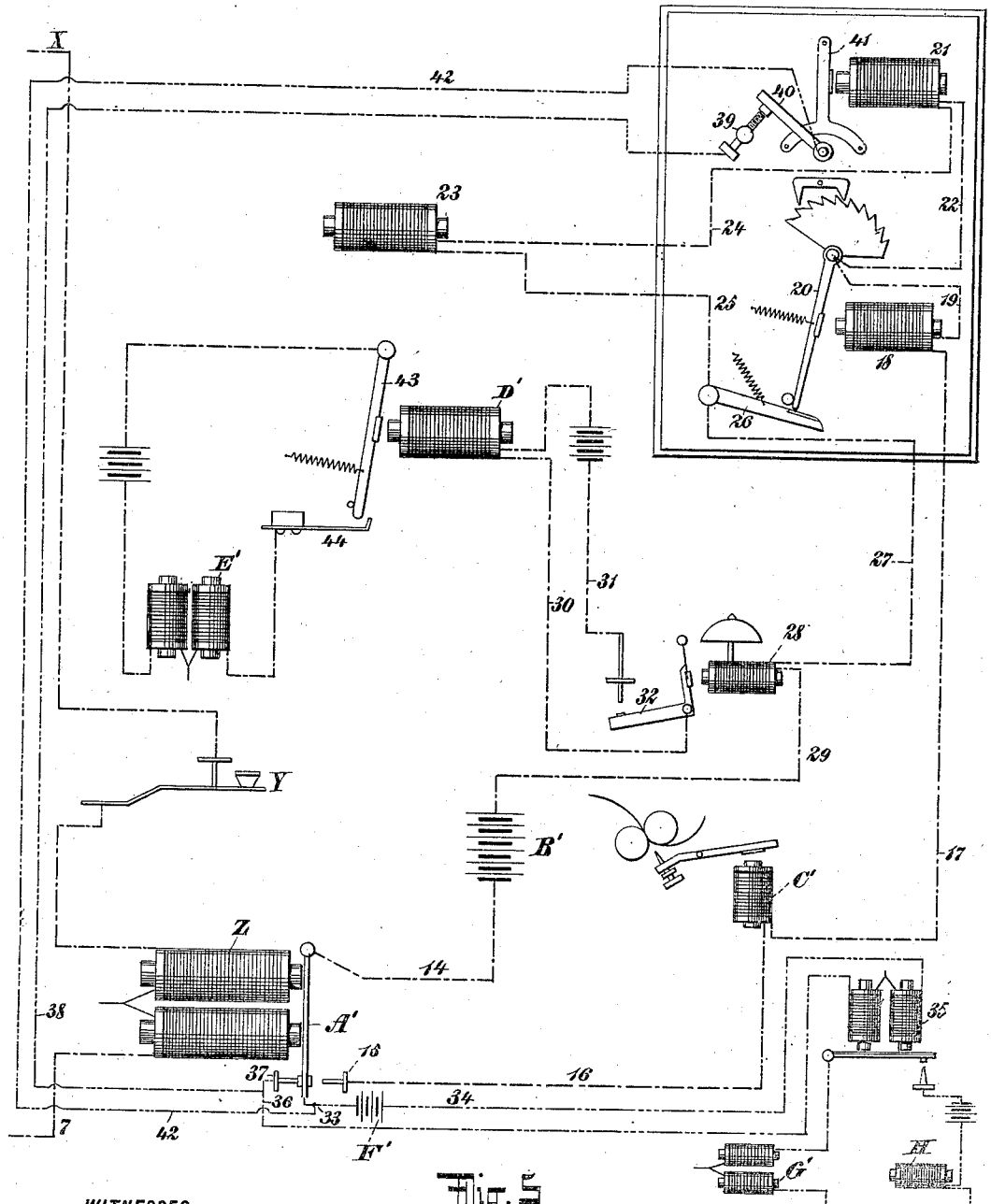

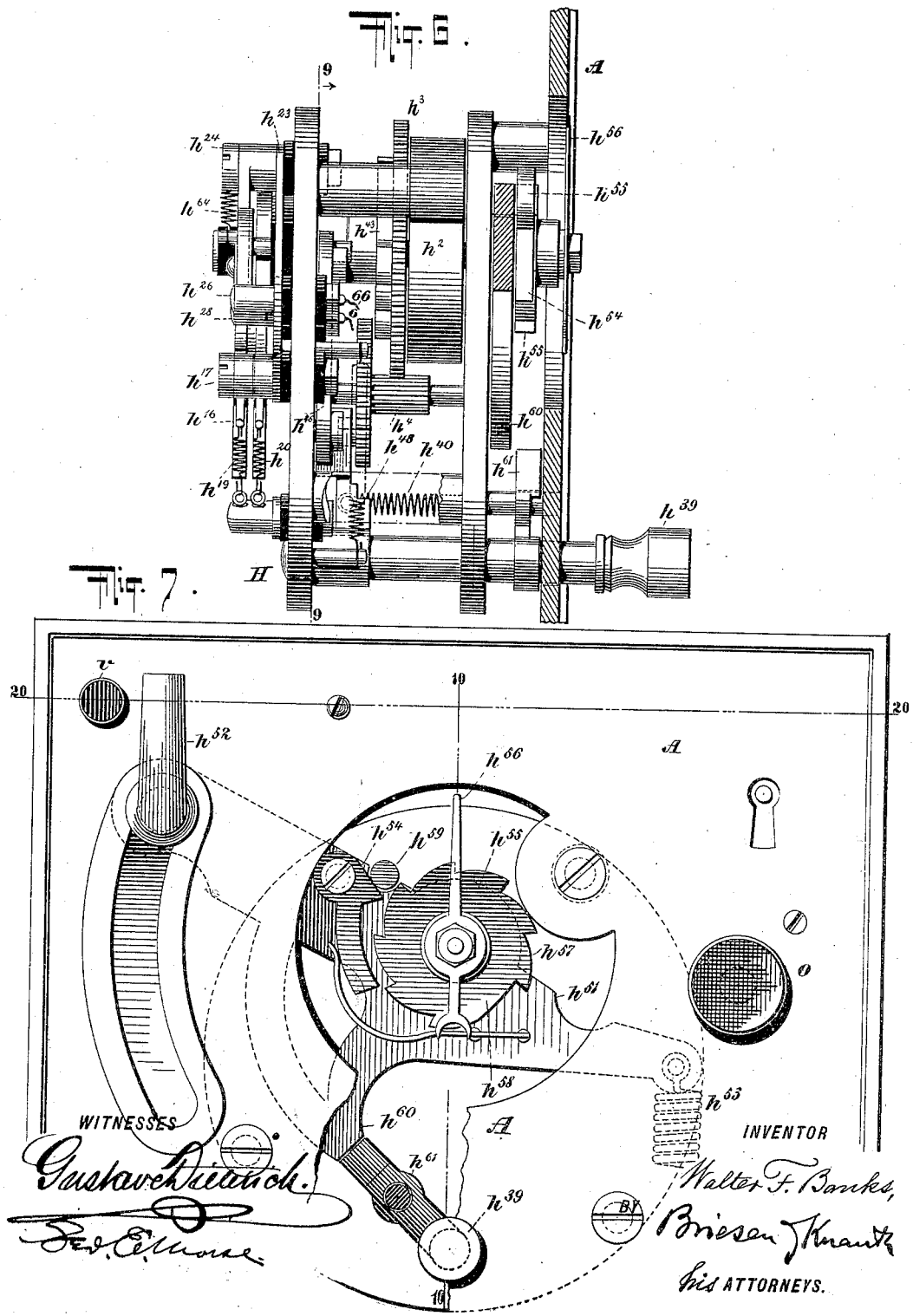

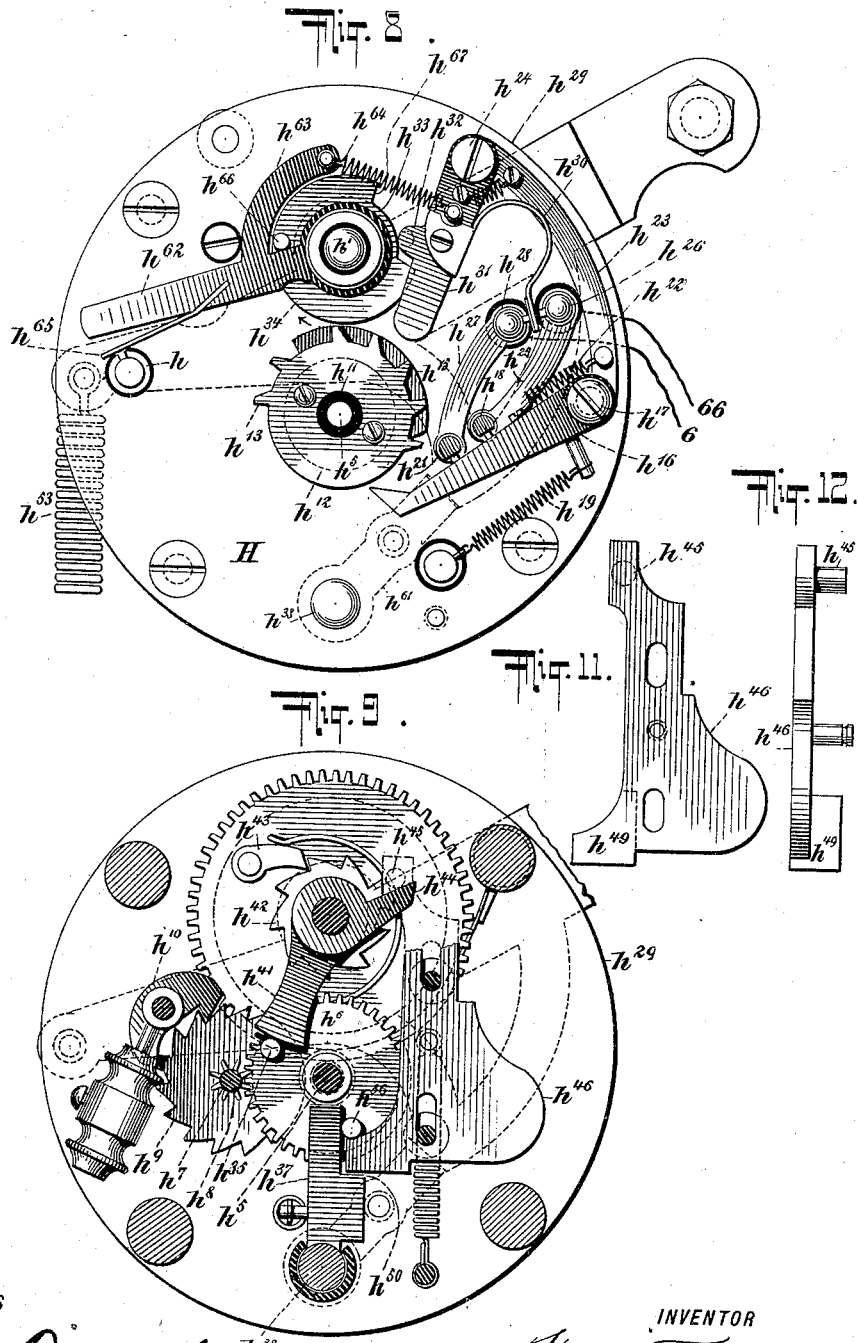

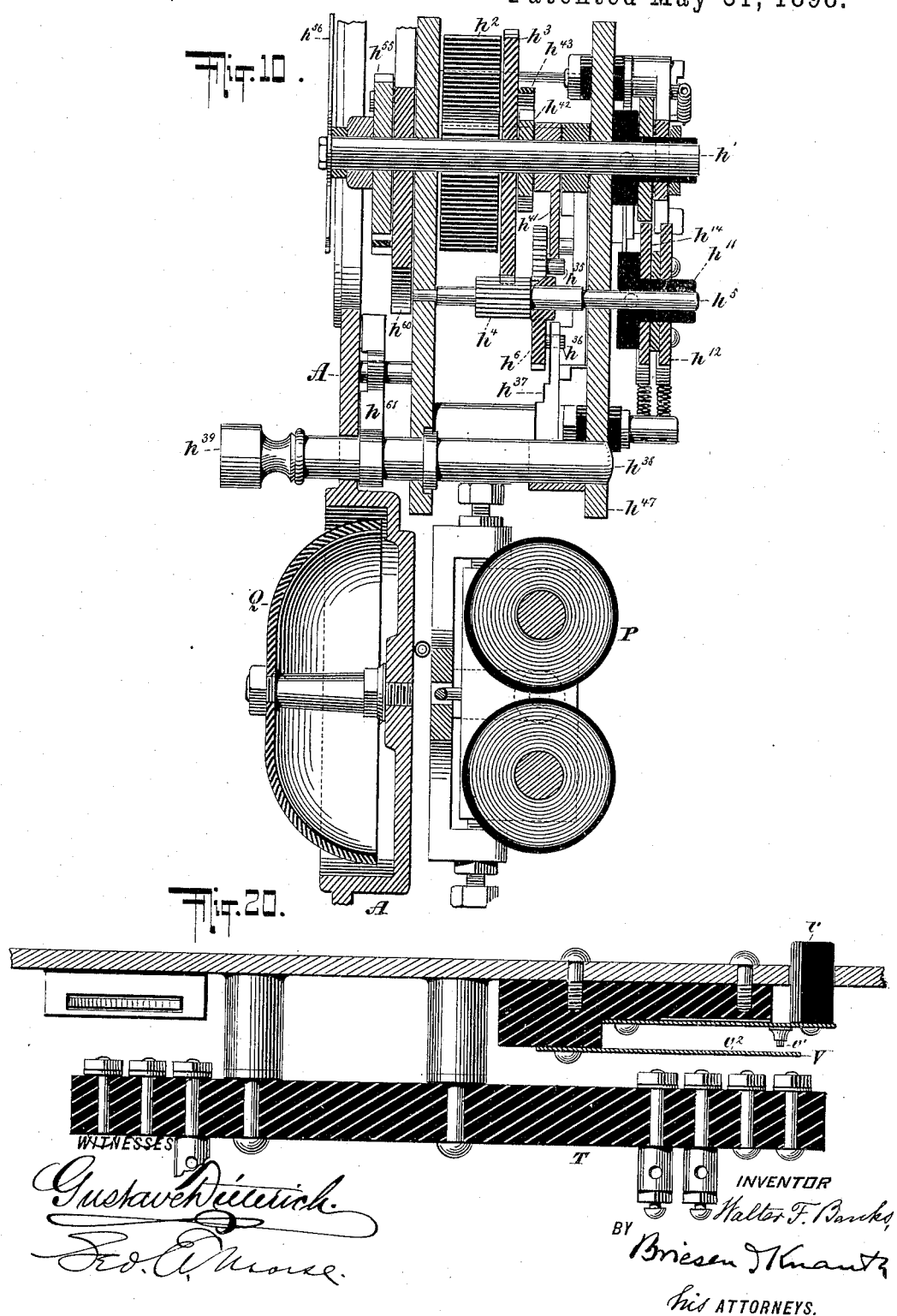

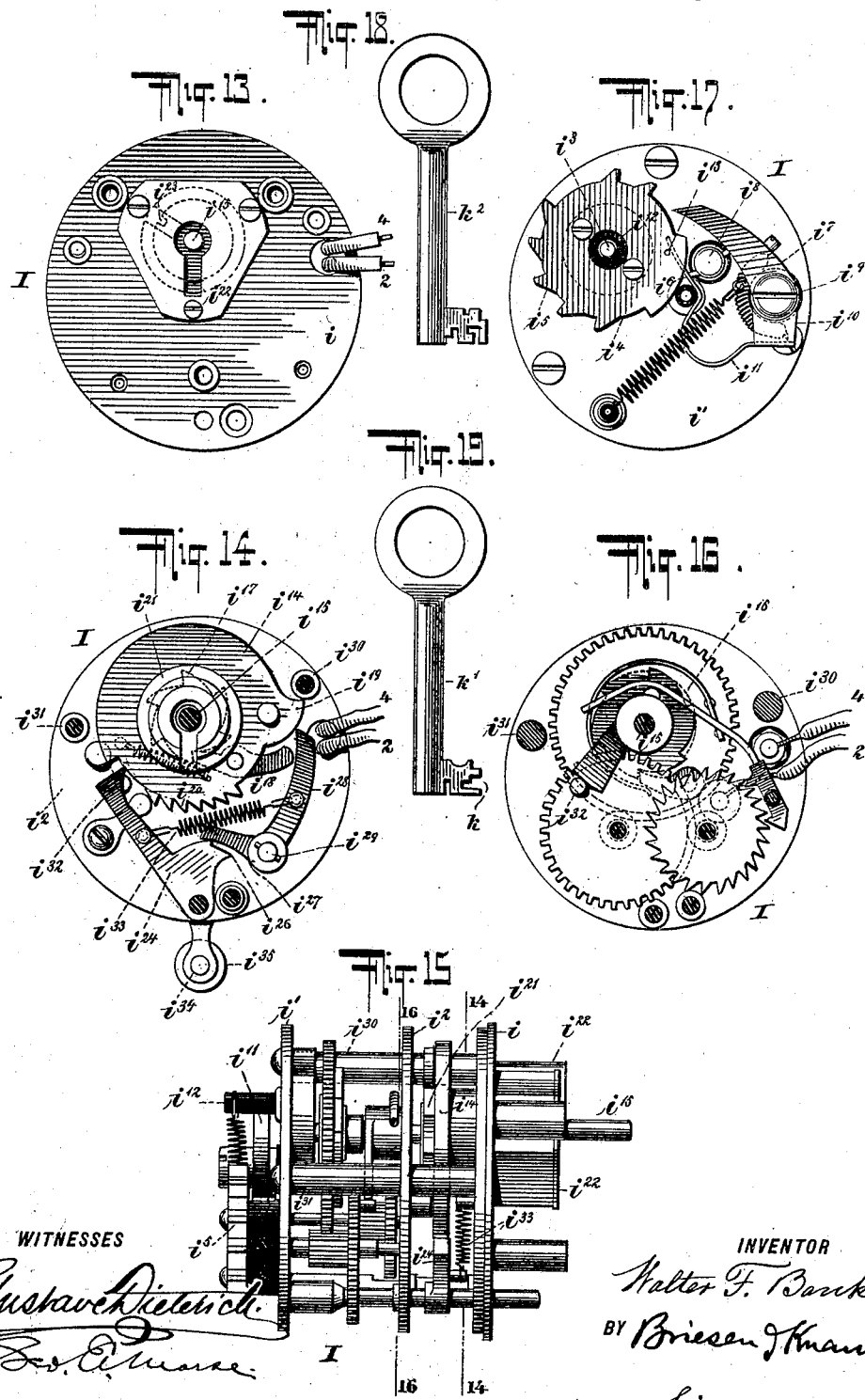

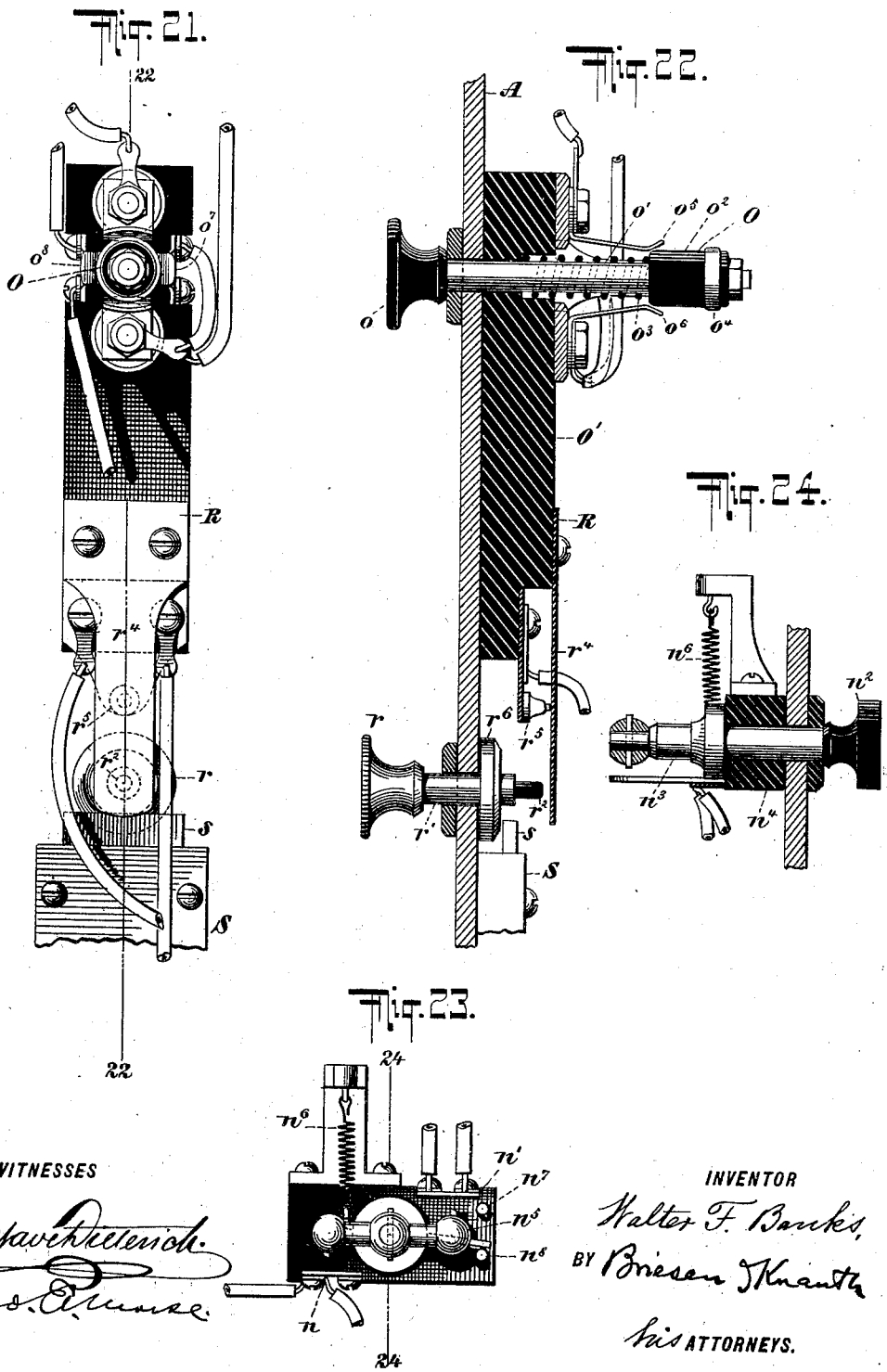

(No Model.)

W. F. BANKS.
ELECTRICAL SIGNALING SYSTEM AND APPARATUS.

No. 604,712.

Patented May 31, 1898.

Mary
UNITED STATES PATENT OFFICE.

WALTER F. BANKS, OF MILFORD, CONNECTICUT, ASSIGNOR TO THE NATIONAL ELECTRICAL MANUFACTURING COMPANY, OF SAME PLACE.

ELECTRICAL SIGNALING SYSTEM AND APPARATUS.

SPECIFICATION forming part of Letters Patent No. 604,712, dated May 31, 1898.

Application filed October 1, 1896. Serial No. 607,547. (No model.)

*To all whom it may concern:*

Be it known that I, WALTER FREDERICK BANKS, a resident of Milford, New Haven county, State of Connecticut, have invented certain new and useful Improvements in Electrical Signaling Systems and Apparatus, of which the following is a specification.

My invention relates to electrical signaling systems and apparatus, and has for its object to produce a signaling system and apparatus whose operation shall be positive and certain.

My invention is especially capable of embodiment in so-called "municipal" signaling systems, although the invention is not limited thereto, and the system and apparatus may be utilized for various signaling purposes—such, for instance, as fire-alarm, railway, cable, and hotel signaling and the like.

My invention consists in the construction hereinafter described and particularly pointed out and claimed.

My invention will be understood by referring to the accompanying drawings, to which reference is hereby made, which illustrate a signaling system and apparatus embodying my invention, the same being shown as a police or municipal signaling system and apparatus.

Figure 1:
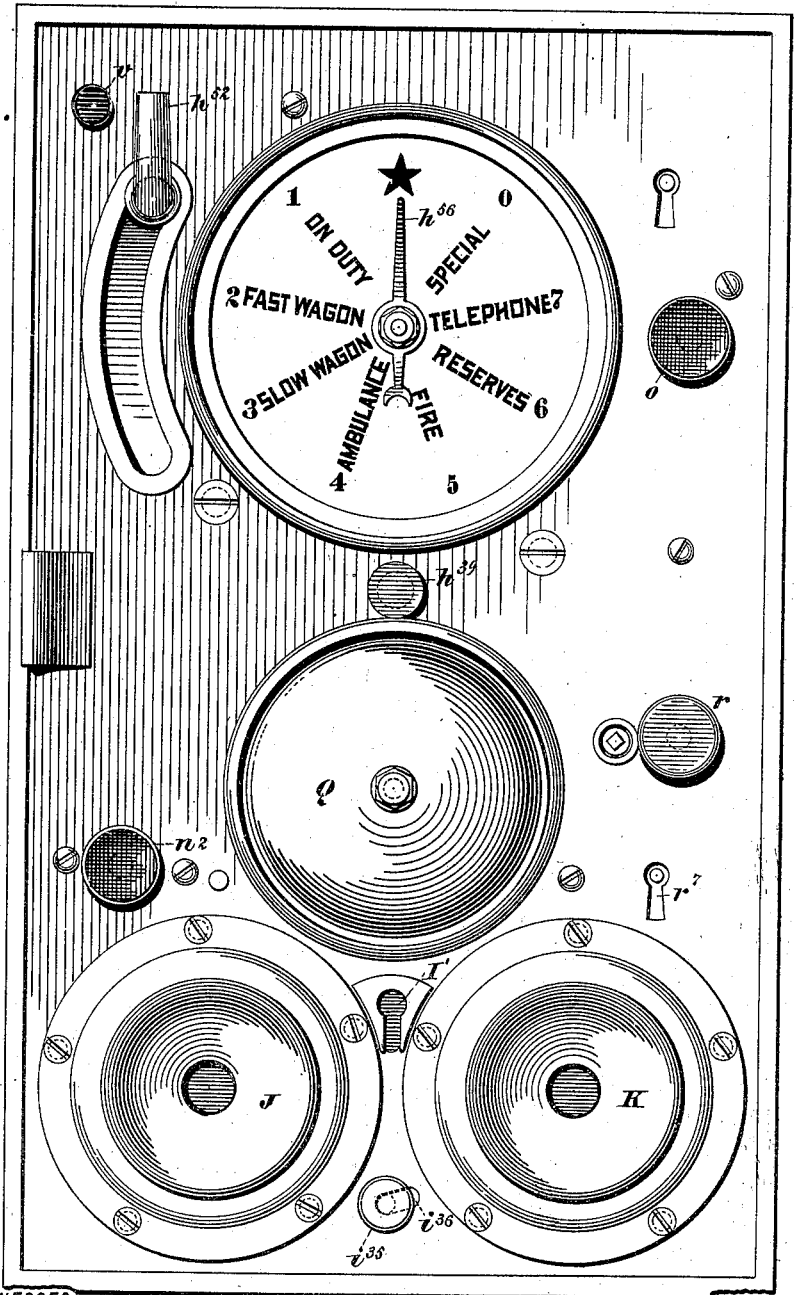
Figure 2:
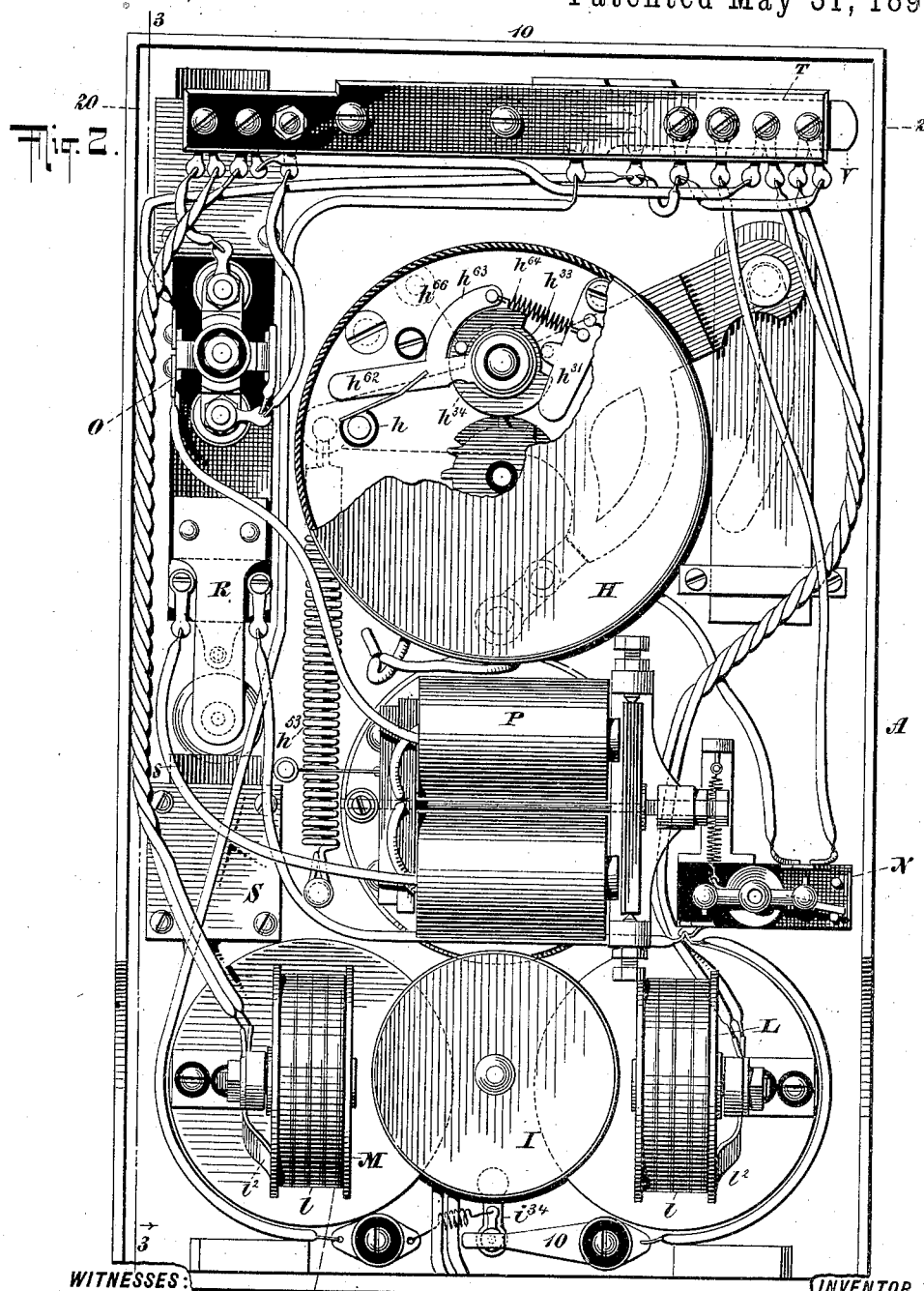
Figure 25:
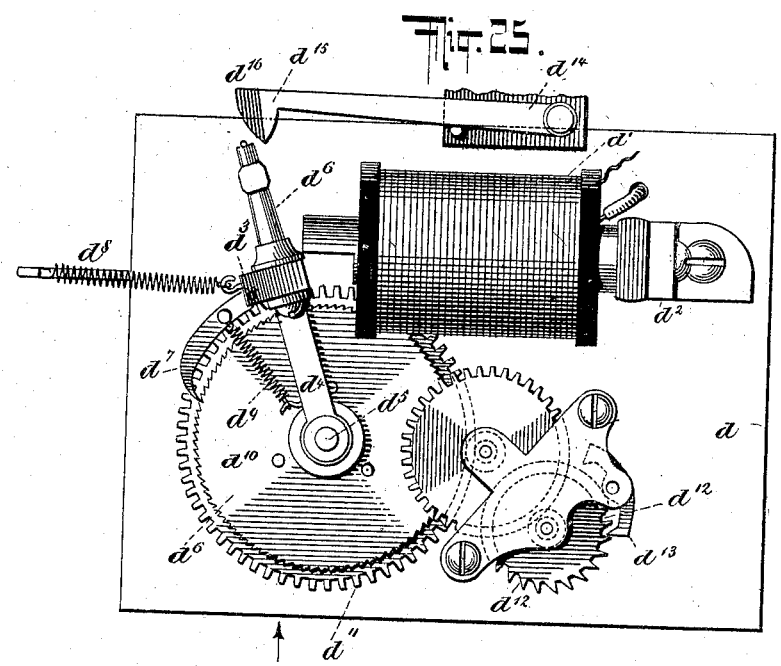
Figure 26:
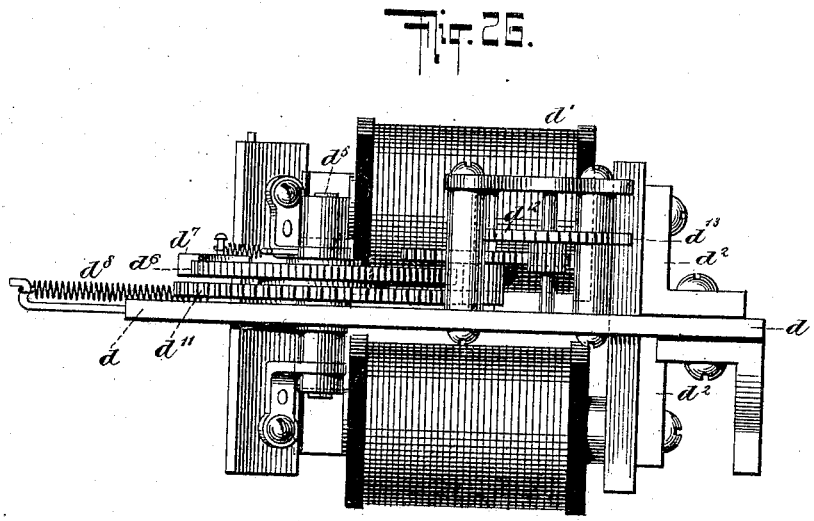

In the drawings, Figure 1 is a face view of the front plate of the signaling box or apparatus with the front door removed, exhibiting the various parts which appear on the front of the box. Fig. 2 is a view of the interior of the box, the direction of the view being from the rear. This is a general view showing the preferred construction and location of the various parts. Fig. 3 is a sectional side elevation of the interior arrangements of the box, the view being taken from the right of Fig. 1 and the left of Fig. 2 on the line 3 3 of Fig. 2. Fig. 4 is a detail diagrammatic view exhibiting the signaling-box and the signaling-circuits therein. Fig. 5 is a diagrammatic view of the circuits and apparatus at the central station. Figs. 4 and 5, taken together, illustrate an embodiment of my system in its simplest form. Fig. 6 is a side view of the signaling-movement which, to distinguish it from the auxiliary signaling-movement, also contained in the box, will hereinafter be termed the "main" signaling-movement. Fig. 7 is a front face view, on an enlarged scale, of the upper portion of the signal-box, the dial being removed to clearly show the setting arrangement for the pointer and the main signaling movement. Fig. 8 is a rear view of the main signaling-movement. Fig. 9 is a sectional view of the main signaling-movement, looking from the front of the box, the section being taken on line 9 9 of Fig. 6. Fig. 10, Sheet 8, is a vertical transverse section through the signaling-box and main signaling-movement, the section being taken on the center line of the box—that is to say, the line 10 10 in Figs. 1, 7, 8, and 9. Fig. 11, Sheet 7, is a detail face view of the latch for locking the releasing device for the main signaling-movement in its rear or releasing position, and Fig. 12 is a side or edge view thereof. Fig. 13, Sheet 9, is a face view of the auxiliary signaling-movement. Fig. 14 is a face view of the key-trap mechanism thereof, which lies immediately beneath the front plate shown in face view in Fig. 13. Fig. 15 is a side view of the said auxiliary signaling-movement. Fig. 16 is a section on line 16 16 of Fig. 15, showing the motor for the signal-wheel. Fig. 17 is a rear view of the auxiliary signaling-movement. Fig. 18 illustrates a special key for use with the auxiliary signaling-movement and so constructed as to be trapped by the said auxiliary signaling-movement. Fig. 19 illustrates a regular key which is also adapted to operate the auxiliary signaling-movement from the outside of the box and which will not be trapped by the key-trap mechanism of the auxiliary signaling-movement. Fig. 20, Sheet 8, is an enlarged sectional view of a short-circuit or cut-out key for short-circuiting the magnet of the signal-bell in the box, showing the construction and mounting thereof upon the face of the inner box, the section being taken on line 20 20 of Fig. 2. Fig. 21 is a rear view of a portion of the inner box, showing the telephone call and cut-in switch and the signaling or strap key and the lock therefor, all of which will be hereinafter fully described. Fig. 22 is a section on line 22 22 of Fig. 21. Fig. 23 is a face view of a correcting or cut-out key for short-circuiting the signal-box, and Fig. 24 is a section on line 24 24 of Fig. 23. Fig. 25 is a face view of a special contact device which I employ to control the time-stamp to manipulate it only at the completion of the signal or for other purposes. Fig. 26 is an edge view thereof, the parts being in the positions shown in Fig. 25, the direction of view being upward, as per the arrow in Fig. 25.

Before proceeding to describe the parts that are shown in the drawings I will proceed to identify them in a general way in order that their location and arrangement may be comprehended at once.

Referring particularly to Figs. 1, 2, and 3 of the drawings, A is the front plate of a signaling-box B. This front plate A is ordinarily covered by a swinging door, which is not shown, and is itself hinged to the box B by means of a hook-hinge C. The plate A swings upon the lower front edge D of the box B and is provided at or near its top with a lock E for locking it in place when it is in a vertical position.

Mounted upon the sides of the box B are a plurality of sets of pins F and G. The pins G catch in the slot or bill of the hook C when the inner front plate A is swung forward and downward, so as to support the front plate when it has reached the extremity of its swing, and the pins F coöperate with the point of the bill of the hook C, as shown in dotted lines in Fig. 3, so that the front plate A is rigidly locked in place at its lower end by the pins F and hook and at its upper end by the lock E. Mounted upon the rear face of the front plate of the signaling-box is the main signaling-movement H. This signaling-movement is for the purpose of sending the box-call and the emergency calls over the line during ordinary conditions. Mounted also upon the rear face of the front plate A is an auxiliary signaling-movement I. The operation of this movement is effected from the outside of the box through the hinged door and front plate by means of a key, as will be hereinafter described, and in the present instance serves the purpose of sending in one emergency call and the box-number. In the construction illustrated its purpose is to enable a citizen to send in an alarm with a special key provided for that purpose and shown in Fig. 18, which key will be trapped by the auxiliary movement. The auxiliary movement may also be operated by a regular or police key, (shown in Fig. 19,) which key will not be trapped by the auxiliary movement.

Mounted upon the front plate A are one or more telephones J K, which are seated in apertures in the front plate, as shown, and are provided with flexible conductors or cords, which are wound upon the reels L M, mounted upon the rear face of the front plate A, so that the telephones may be pulled out for the purpose of telephoning or listening.

N (see Figs. 2, 23, and 24) is a "correcting-key," so called, for the purpose of short-circuiting the box for testing or correcting a call. In the present instance it is shown as a switch for short-circuiting the signaling-wheels of the main signaling-movement, so that should a wrong call be pulled on the main signaling-movement the signaling-movement may be short-circuited by the key N, so that the signal-wheels may revolve without sending in any signal, in order that when this operation has taken place the box may be reset and the proper signal sent in, or any desired part of the signal may be kept off the line by short-circuiting the movement while this part of the signal is being made.

O (see Figs. 2, 3, 21, and 22) is a telephone calling and switching jack which serves to signal over the telephone-line to the central station and to thereupon cut the box-telephone instrument into the line, all of which will be clearly explained, it being merely premised for the present that there is a telephone-line paralleling the signal-line to central and using the signaling-line with its battery as a common return.

P is a signaling-magnet adapted for receiving test or return signals, (see Figs. 2, 3, 4, and 10,) and Q is the tap-bell struck thereby.

R is a signaling-key or strap-key. (See Figs. 2, 21, and 22.) This key is normally locked from operation by lock S, as will be hereinafter explained.

The various circuits in the box run to and from a universal insulator-bar T in the top of the box, and mounted upon the rear plate of the box is a combined switch and lightning-arrester U. It will be observed that all the operating parts of the box are carried upon the swinging front plate.

Referring particularly to Figs. 1, 7, and 20, it will be observed that there is in the upper left-hand corner of the front plate a key V, manipulated by a button $v$, which extends through the front plate. This key is the cut-out key and, when the door of the box is closed, is pressed inward until its contact-point $v'$ contacts with the strip $v^2$, so that a short circuit around the magnets of the signal-bell in the box will be made.

Having described the general arrangement of the box, I will now proceed to describe the circuit therethrough and the central-station circuits, having reference to Figs. 4 and 5, which represent diagrammatic views thereof. Starting from the main battery W in Fig. 4 the current passes by wire 1 to and through the signaling-key R, thence by wire 2 to and through the contact apparatus of the auxiliary signal mechanism or movement I, thence by wire 4 to and through the return-signal-receiving magnet P, and by wire 5 to and through the contact apparatus of the main signaling-movement H to the wire 6, whence it passes over the main-line wire X to the central station, passing first to a main-line strap-key Y, thence through a relay Z, through a wire 7, back to the battery.

The return-signaling magnet P is short-circuited through the key V as follows: Starting from the wire 5 between the magnet P and the main signaling-movement H by wire 8 the current passes to and through the key V, thence by wire 9 to and through the contact apparatus 10 $i^{34}$, by wire 11, to wire 4, which it joins at a point between the auxiliary signaling mechanism and the signaling-magnet P. Thus when the key V is closed by the closing of the door of the box the signaling-magnet P is short-circuited. Sprung across the wires 1 to 6 of the signal-box is a short circuit comprising a wire 12, leading from wire 1 to one terminal $n$ of the correcting-key N, and a wire 13, leading from wire 6 to the opposite terminal $n'$ of the correcting-key N, so that by turning the correcting-key by means of its haft or button $n^2$ the box may be short-circuited. This, however, can only be done when the door is swung open to expose the front plate of the box, as the correcting-key is inaccessible from the outside of the box when the door is closed.

The arrangement of the central station is clearly shown in Fig. 5, wherein the armature A' manipulates the circuits. One of these circuits, which is fed from the station-battery B', extends from the said battery by the wire 14 to the armature A', to its back-stop $A^{15}$ by wire 16 through a register C', thence by wire 17 through a magnet 18. This magnet operates as a controller for the visual-signal-indicator magnet 21. The circuit thence passes by wire 19 to the armature 20, controlling a short circuit around the visual-indicator magnet 21. This magnet 21 for actuating the indicator-pointer is electrically connected to the armature 20 by wire 22 and to the magnet 23 for actuating the electromechanical gong by wire 24. The short circuit for these two magnets is comprised by the wire 25, the swinging arm 26, and the armature 20. This armature is provided at the rear with a governing device or governor, here shown as a pawl-and-ratchet retarding mechanism, so that the armature 20 will be brought up to its magnet 18 slowly, being meantime kept in contact with the swinging arm 26, so that a short signal or impulse sent through the controller 18 will last long enough time to draw the armature forward far enough to carry it off the swinging arm 26, so that the short circuit around the magnets 21 and 23 will not be broken by short impulses coming over the line, but will be broken by the long impulses coming over the line, thereby responding to the long or emergency signals, thereby causing the magnets 21 and 23 to respond to a long or emergency signal and maintaining them free from actuating-current during the short impulses which register the box-number, it being understood that the box signaling mechanism sends two characters or calls, one being composed of a series of short signals or impulses, which designate the box from which the signal is sent, and the other of one or more long or emergency signals or impulses to indicate a "want." The want, therefore, will be indicated upon the electromechanical gong by the operation of its magnet 23 and upon the indicator by the operation of its magnet 21, the box-number not being indicated by these devices. It will be observed that when the armature 20 is uncovered the said armature and its magnet will operate as a primary-signal-receiving device, and the magnet 21 and its armature will operate as a secondary-signal-receiving device. The current passes from the swinging arm 26 by wire 27 to and through a tap-bell 28, thence by wire 29 to the battery B'. The tap-bell 28 is shown as manipulating a contact device D', which controls a time-stamp E', a type of which contact device is shown in Figs. 25 and 26. This contact device D' is manipulated from the tap-bell through the medium of a suitable circuit comprising wires 30 31 and an actuating-contact 32. One of the terminals 33 of a repeater-line is connected to the armature A'. This repeater-line comprises the wire 33, battery F', wire 34, relay 35, and wire 36, which is connected to the front stop 37 of the armature A'. Operating the armature A' will make and break the circuit of the relay 35, causing the said relay to manipulate the circuit of the gong-magnet G' and register H'. This gong, register, and relay may be located in a wagon-house to give an emergency wagon call, and in order to do this it is necessary that only the special or want signals should be indicated at such wagon-house. In order to accomplish this, a short circuit is formed around the terminals 33 37 and manipulated by the magnet 21, which actuates the indicator or pointer. The manipulating apparatus for this indicator or pointer and its controlling mechanism form the subject-matter of an application for patent by me filed on even date herewith, Serial No. 607,548, and issued as Letters Patent No. 587,693, dated August 10, 1897. This short circuit consists of the wire 38, which runs to the stop 39, with which stop a swinging arm 40 coöperates, which swinging arm is actuated by a swinging arm 41 of the indicator-magnet 21. From the arm 40 the circuit extends by wire 42 to the terminal 33, so that the armature A' will manipulate the repeater-circuit only at such times as the short circuit 38 to 42 is open, which, as before explained, will be during the flow or pendency of a long or emergency signal. The armature 43 of the contact device D' manipulates the time-stamp E', and is so arranged that when once drawn up to its armature it will pass its contact-spring 44 without energizing the magnet E', as will be fully explained when describing Figs. 25 and 26, and will not be retracted from the magnet (controller) D' until the entire signal has been sent in—that is to say, until the current has entirely ceased to flow on the line—when the armature 43 will be retracted, and on its return stroke will close the circuit of the time-stamp E′, thereby recording the time of receipt of the message.

From the foregoing it will be obvious that as the box is pulled to send in calls comprising one or more long emergency or special signals followed by a series of short locality signals or calls comprising a series of short locality signals only the locality signals will be indicated on the register C′ at the central station and upon the tap-bell 28 and will swing the armature 20 of the magnet 18 without, however, opening the short circuit around the gong-magnet 23 or the indicator-magnet 21 and without giving any indication over the repeater-line by reason of the fact that the short circuit 38 to 42 is intact. When the special or emergency signal has been received, the locality signal begins. The special signals being long impulses, as explained, each long impulse or signal will not only work the register and the tap-bell 28, but will also swing the armature 20 far enough to break the short circuit around magnets 21 and 23, thereby allowing current to pass through said magnets and operate the indicator and the gong-magnet 23 and open the short circuit of the repeater-circuit. During each impulse of a call the armature 43 will be drawn up to its magnet and will cause the time-stamp to operate only upon the completion of the signal.

I will now proceed to describe the construction and operation of the main signaling mechanism or movement, referring particularly to Figs. 2, 3, 6, 7, 8, 9, 10, 11, and 12. In these figures, $h'$ is the main or operating shaft of the movement and carries the usual spring or winding barrel $h^2$ and gear-wheel $h^3$, which gear-wheel $h^3$ meshes with a pinion $h^4$ in the usual manner upon a signal-wheel shaft $h^5$, which is provided with a wheel $h^6$, meshing with a pinion $h^7$ on an escapement-shaft $h^8$, which carries a scape-wheel $h^9$, with which a swinging weighted pawl or click $h^{10}$ engages. The parts just described constitute the motor and escapement mechanism of the signal-wheel shaft $h^5$. This signal-wheel shaft $h^5$ carries an insulating-bushing $h^{11}$ (best seen in Fig. 10) and upon the bushing a locality-signal wheel $h^{12}$, in whose periphery a series of notches are cut, leaving between them the metal in the form of signal-spurs $h^{13}$, and also carries an emergency-signal wheel $h^{14}$, shown in the present instance as having a single long signaling-tooth $h^{15}$. Cooperating with the locality-signal wheel $h^{12}$ is a rigid contact-lever $h^{16}$, which swings upon the pivot $h^{17}$ and is held against a contact-post $h^{18}$ by a spring $h^{19}$. Carried upon the same pivot $h^{17}$ and cooperating with the emergency-signal wheel $h^{14}$ is a similar rigid lever or contact-piece $h^{20}$, (see Fig. 6,) which is held against the contact-post $h^{21}$ by a spring $h^{22}$. (See Fig. 8.) The pivot $h^{17}$ is insulated from the plate or frame $h^{29}$ of the movement H and is connected by a bar $h^{23}$ with another post $h^{24}$, which is also insulated from the frame $h^{29}$ of the signal-movement. The contact $h^{18}$ is carried upon a bar $h^{25}$, which is fixed upon a post $h^{26}$, which is insulated from the framework and to which the wire 66 is connected, as is clearly shown in Figs. 4 and 8. The other contact $h^{21}$ is connected to a bar $h^{27}$, which is mounted upon a post $h^{28}$, insulated from the framework of the movement and in electrical connection with the wire 6, as is also clearly shown in Fig. 4. As the signal-wheels revolve under the influence of the motor they bring their teeth in contact with the contact-levers $h^{16}$ and $h^{20}$, thereby swinging the said levers on their pivots $h^{17}$ and lifting them away from their contacts $h^{18}$ and $h^{21}$, thereby sending in the signal, as will be explained. Before proceeding further, however, I would state that only one of the contact-levers is in circuit at a time. This is effected by means of a contact-spring $h^{30}$, which is carried upon a switch-lever $h^{31}$, which is carried upon the pivot or post $h^{24}$ and is provided with a toe $h^{32}$, which is adapted to drop into a slot or recess $h^{33}$ in a cam-wheel $h^{34}$, which is carried upon the main or operating shaft $h'$ of the movement, which cam when rotated by the shaft $h'$ in setting the movement will swing the switch-lever $h^{31}$ and raise the contact-spring $h^{30}$ away from the post $h^{28}$ and bring it against the post $h^{26}$, it being understood that the post $h^{26}$ and contact $h^{18}$ cooperate with the contact-lever $h^{16}$, which sends in the locality signals. The gear-wheel $h^6$ on the signal-wheel shaft $h^5$ carries a plurality of pins $h^{35}$ $h^{36}$, one of which pins, $h^{36}$, contacts with a step-shaped stop $h^{37}$ on a releasing-plunger $h^{38}$, which projects through the front plate A of the box and is provided with a push-button $h^{39}$. This plunger $h^{38}$ may be pressed inward by hand and is impelled outward to restore it to its normal position by a spring $h^{40}$, (clearly shown in Fig. 6,) so that when the motor has been wound or set for movement the stop $h^{37}$ will hold it from moving until the said stop has been moved off the pin $h^{36}$ by pushing the plunger $h^{38}$ inward. The other pin $h^{35}$ on the wheel $h^6$ is a stop-pin which cooperates with a stop-arm $h^{41}$ on the shaft $h'$. When the box is at rest and unset, this pin $h^{35}$ rests against the arm $h^{41}$, the said arm turning with the shaft $h'$ during the running of the movement to send in the signal and being brought into position to cooperate with the stop-pin $h^{35}$ at the proper moment to stop the movement. Carried also upon the shaft $h'$ is a ratchet $h^{42}$, which cooperates with a pawl $h^{43}$ on the spring-barrel, so that the main shaft and ratchet may be stepped around in the ordinary manner to wind the box. Carried also upon the shaft $h'$ is a lifting-arm $h^{44}$, which engages a pin $h^{45}$ upon a catch-plate or latch $h^{46}$, (shown in detail in Figs. 11 and 12,) which latch is carried upon the rear plate $h^{47}$ of the movement and has a tendency to descend imparted to it by a spring $h^{48}$. When the parts are in their normal or idle position—that is to say, the position shown in Fig. 9—the latch will be held up by the arm $h^{44}$ and will be pulled downward by its spring $h^{48}$ as soon as the arm $h^{44}$ begins to move when the box is being set and will then rest on the edge or shoulder $h^{50}$ of the stop-lever $h^{47}$, so that it will drop in front of the stepped stop-lever $h^{37}$ when the said stop-lever is carried inward by its plunger $h^{38}$ away from the stop-pin $h^{36}$ on the trip-wheel $h^6$ and release the said wheel, whereby the plunger will be held in its pushed-in position by the latch until the signal has been sent in, when as the movement returns to its normal position the arm $h^{44}$ will lift upon the latch $h^{46}$, pulling it away from engagement with the stop-lever $h^{37}$, and thereby releasing the plunger, which will thereupon be sprung into its outward position by its spring $h^{40}$. These operations will be understood by referring to Fig. 9, wherein it will be noticed that a toe $h^{49}$ of the latch projects over a shoulder $h^{50}$ of the stop-lever $h^{37}$.

The setting of the box or main signal-movement is accomplished as follows: Swinging upon the shaft $h'$ of the movement is a setting-lever $h^{51}$, which is operated by a hook or handle $h^{52}$, (see Figs. 1, 3, and 7,) which projects through the front plate of the box and is restored to its initial position by a restoring-spring $h^{53}$. (See Figs. 2 and 7.) This setting-lever is provided with a spring-pressed setting-pawl $h^{54}$, which coöperates with a setting ratchet-wheel $h^{55}$, carried rigidly upon the main operating or setting shaft $h'$, which is also shown as carrying a pointer $h^{56}$. This setting ratchet-wheel is provided with a series of relatively short ratchet-teeth $h^{57}$ and a relatively long ratchet-tooth $h^{58}$.

A stop-pin $h^{59}$ is provided for moving the pawl $h^{54}$ away from the ratchet-wheel when the setting-lever is in the normal position. (Shown in Fig. 7.) The long tooth $h^{58}$ is of greater extent than the stroke of the pawl $h^{54}$, so that when the pawl contacts with the short teeth its swing will carry the ratchet and its shaft around a distance of one short tooth, thereby winding the spring-barrel $h^2$. The ratchet may thus be stepped around one tooth at a time until the pawl $h^{54}$ reaches the curved face of the tooth $h^{58}$, when the stroke of the pawl not being long enough to carry it off the upper surface of the tooth $h^{58}$ straining or overwinding the movement after the limit of the box calls or signals is reached is prevented. Carried also by the setting-lever $h^{51}$ is a stop $h^{60}$, whose movement is unobstructed when the releasing-plunger $h^{38}$ is in its outward position, but which when the plunger is in its inward position is obstructed by the catch-lever $h^{61}$, (see Fig. 6,) which is carried upon the plunger $h^{38}$ and moves therewith, being brought into the path of the stop $h^{60}$ when the plunger has been pushed in, so that when the plunger has released the movement and is in its inward position the setting-lever cannot be moved until the movement has sent in its signal and has released the plunger, which is thereupon sprung outward by its spring and carries the catch-lever $h^{61}$ out of the path of the stop $h^{60}$. The stop $h^{60}$ being arc-shaped subserves another valuable function in combination with the catch-lever $h^{61}$—to wit, preventing the signal mechanism from being released while the swinging setting-arm $h^{51}$ is being swung or is in any position other than the normal—for by referring to Fig. 7 it will be seen that as long as the arm $h^{51}$ is in its highest or normal position the plunger may be pushed in, the catch-lever $h^{61}$ passing freely under the stop $h^{60}$; but when the swinging setting-lever $h^{51}$ is swung downward the arc-shaped stop $h^{60}$ will come into the path of movement of the catch-lever $h^{61}$ and will thereby prevent the movement from being released to send in a signal. By this combination of mechanism I have therefore a means for preventing overwinding of the box and a reciprocal means for preventing the signaling mechanism from being released while the setting mechanism is in operation and for holding the setting mechanism inactive while a signal is being transmitted.

Carried also upon the shaft $h'$ is a short-circuiting lever $h^{62}$, which is provided with an arm $h^{63}$ and with a spring $h^{64}$, which connects the said arm $h^{63}$ with the switch-lever $h^{31}$. This spring therefore serves to hold the toe $h^{32}$ of the swinging bar $h^{31}$ against the cam-wheel $h^{34}$. The short-circuiting lever or bar $h^{62}$ is provided with a contact-spring $h^{65}$, which contacts with the post $h$ and serves to short-circuit the signal-wheels, as will clearly appear by reference to Fig. 4, wherein a theoretical diagram of the box-circuits is shown. In the normal position of the movement—to wit, that shown in the drawings—the contact-spring $h^{65}$ will rest against the contact-post $h$, thereby forming a short circuit to the main signaling-movement. The short-circuiting lever is pressed downward against the post $h$ by means of a pin $h^{66}$ on the cam-wheel $h^{34}$. When the spindle or main shaft $h'$ is rotated to set the movement, the rotation will be in the direction of the arrow in Fig. 8, and when the movement is released the rotation will be in the reverse direction, so that in setting a signal the pressure of the pin $h^{66}$ upon the short-circuiting lever will be relieved, and its spring $h^{64}$ will separate the contact-spring $h^{65}$ from the contact-post $h$, thereby breaking the short circuit around the signal contact-levers.

The operations of the main signaling mechanism in the regular order are as follows: If the operator desires to send in the first of the special or emergency signals, which is the second call of the box which is here marked "Fast wagon," he seizes the hook $h^{52}$ and pulls down upon it, thereby engaging the pawl $h^{54}$ with a tooth $h^{57}$ of the ratchet $h^{55}$, and rotates the ratchet and the main shaft $h'$ a space of one tooth, which rotating shaft $h'$ carries with it the cam-wheel $h^{34}$, thereby lifting the pin $h^{66}$ away from the short-circuiting lever $h^{62}$, permitting the said lever to be retracted from its contact-post $h$ to break the short circuit around the signal-levers and also brings the edge or shoulder $h^{67}$ of the cam-wheel $h^{34}$ against the toe $h^{32}$, thereby slightly rocking the switch-lever $h^{31}$ to rub the contact-spring $h^{30}$ back and forth on the post $h^{28}$, so as to rub these parts together to keep them clean, but without lifting the contact-spring $h^{30}$ off the said contact. By this movement the operator has set the wheels for one rotation and has moved the pointer around one space to the point marked "On duty." When the parts have been thus moved by the operator, the stop-arm $h^{41}$ will have been moved away from the stop-pin $h^{35}$ on the wheel $h^6$ and the lifting-arm $h^{44}$ will have swung downward a little way to permit the catch-plate $h^{46}$ to descend. These arms $h^{41}$ and $h^{44}$, as has been explained, rotate with the shaft $h'$ of the setting or motor mechanism and are brought back to their normal position by the return movement or rotation of the motor mechanism during the transmission of the signal. With the parts in the positions just described the spring $h^{48}$ forces the toe $h^{49}$ of the latch $h^{46}$ against the top of the shoulder $h^{50}$ on the stop-lever $h^{37}$. The operator again pulls down the hook $h^{52}$ and thereby rotates the ratchet $h^{55}$ and shaft $h'$ the space of another tooth, riding the toe $h^{32}$ of the switch-lever $h^{31}$ up the shoulder $h^{67}$ of the cam-wheel $h^{34}$, bringing the said toe upon the high edge or surface of the said cam-wheel $h^{34}$ and swinging the switch-lever $h^{31}$, moving the contact-spring $h^{30}$ away from the contact-post $h^{28}$ and against the contact-post $h^{26}$. By this operation the emergency-wheel has been cut into circuit and the locality-wheel cut out. After having set the box, as thus described, the operator proceeds to send in the signal. This he accomplishes by pushing in the button $h^{39}$, thereby interposing the catch-lever $h^{61}$ in the path of the stop $h^{60}$, so that the hook cannot be pulled down while the box is sending in its signal and likewise carrying the stop-lever $h^{37}$ backward off the pin $h^6$ and from beneath the toe $h^{49}$ of the latch $h^{46}$, which thereupon drops down in front of the shoulder $h^{50}$ of the stop-lever and holds the same firmly from being sprung outward by its spring. By this operation the stop-lever $h^{37}$ has, as has been explained, been cleared away from the path of the stop-pin $h^{36}$, so that the trip-wheel $h^6$ and shaft $h^5$ will revolve, also thereby revolving the signal-wheels. During the first rotation of the signal-wheels the emergency call alone will be sent in, it being remembered that the contact-spring $h^{30}$ is in contact with the post $h^{26}$ of the signal-wheel mechanism. When this first revolution of the wheels has been accomplished, the rotating cam-wheel will bring its cut-away portion $h^{33}$ beneath the toe $h^{32}$ of the switch-lever $h^{31}$, so that as the toe drops into this cut-away portion the lever $h^{31}$ will carry the spring-contact $h^{30}$ away from the post $h^{26}$ and bring it against the post $h^{28}$, which forms part of the locality-signal-wheel circuit, so that during the last rotation of the wheels the locality call will be sent in. These calls will be received at the central station in the manner heretofore described. As soon as the wheels have finished rotating the parts reach their normal position, the arm $h^{44}$ lifting the plate $h^{46}$ to release the plunger $h^{38}$, which thereupon springs forward, the stop-arm $h^{41}$ just at the proper moment coming into the path of the stop-pin $h^{35}$ and the stop-pin $h^{36}$ coming against its stop-lever $h^{37}$.

Should it be necessary for persons other than an authorized operator to employ the box, it is desirable that some means should be provided for operating the box without the necessity of opening the door. For this purpose I have provided the auxiliary signaling-movement I, which is accessible through the front plate of the box, being reached through the keyhole I' therein by means of keys. (Shown in Figs. 18 and 19.) The door of the box is also provided with a similar keyhole located in front of the keyhole I'. This auxiliary movement, which I have clearly shown in Figs. 13 to 17, Sheet 9, comprises front and back plates $i\ i'$ and an intermediate plate $i^2$.

Between the back plate $i$ and the intermediate plate $i^2$ is the usual signal-box clockwork escapement and stop mechanism for driving the signal-wheel shaft $i^3$. This mechanism is of the ordinary description and is clearly shown in detail in Fig. 16. The shaft $i^3$ carries upon its rear end an auxiliary signal-wheel $i^4$, which is provided with teeth $i^5$ for sending in the signal, one of which is a long teeth $i^6$ for sending in an emergency signal. These teeth coöperate with a rigid swinging signal-lever $i^7$, which coöperates with a contact-post $i^8$ to send a signal, the said post and lever forming the terminals to which wires 2 4 are connected. (See diagram Fig. 4.) Connected to the post $i^9$, around which the lever $i^7$ swings, is a plate $i^{10}$, which carries a contact-spring $i^{11}$, which embraces an insulating-post $i^{12}$ and during the normal position of the movement rests against the post $i^8$, thereby forming a short circuit around the lever $i^7$ and the contact-post $i^8$. The free end of the contact-spring $i^{11}$ rests upon a pin $i^{13}$, which when the parts are in the normal position or position of inaction presses the spring $i^{11}$ against the contact-post $i^8$, but as soon as the wheel begins to rotate passes from under the spring, thereby permitting the spring to break the short circuit around the signal-lever contacts. The auxiliary signal-wheel is set by the key to rotate once, so that when it has completed its rotation the pin $i^{13}$ again causes the spring to short-circuit the contacts.

Located between the intermediate plate $i^2$ and the front plate $i$ is a mechanism for setting the auxiliary signal-box and for trapping a special or so-called "citizen's key." This apparatus is clearly shown in Figs. 13, 14, and 15. Referring particularly to these figures, it will be noted that a cam-plate $i^{14}$ is hung upon the shaft $i^{15}$, which shaft is rigidly secured to the spring-barrel $i^{16}$ or other driving mechanism for the signal-wheel, so that by turning the shaft in the direction of movement of the hands of a watch the signaling mechanism will be set to revolve. Mounted also upon the shaft $i^{15}$ is a ratchet $i^{17}$, with which coöperates a spring-pawl $i^{18}$, carried upon the inner or rear face of the cam-plate, so that when the cam-plate $i^{14}$ turns in the direction of the hands of a watch it will carry with it the shaft $i^{15}$, and when it turns in a reverse direction the pawl $i^{18}$ will slide over the teeth of the ratchet. The cam-plate $i^{14}$ is provided with a spur or cam $i^{19}$ and with ratchet-teeth $i^{20}$. Mounted upon the face of the cam-plate $i^{14}$ is a key-barrel $i^{21}$, which is adapted for the reception of a key such as shown in Figs. 18 and 19. The key-barrel is surrounded by a barrel-shaped escutcheon $i^{22}$, which is provided upon its interior face with a key-arresting projection or stop $i^{23}$. (Shown in dotted lines in Fig. 13.) The escutcheon is stationary, while the key-barrel will revolve with the key and cam-plate. A lever or stop-pawl $i^{24}$ is pivoted at $i^{25}$ upon the intermediate plate of the movement and is provided with a notch $i^{26}$ to receive the tail $i^{27}$ of a catch-lever $i^{28}$, which is pivoted at $i^{29}$ upon the intermediate plate $i^2$ of the movement. These two levers $i^{24}$ and $i^{28}$ are joined together by a spring $i^{33}$ and are both adapted to coöperate with the edge of the cam-lever $i^{14}$. The movement is also provided with posts $i^{30}$ $i^{31}$, against which the cam $i^{19}$ strikes in its movement, so as to limit the oscillation of the cam-plate $i^{14}$. The movement is likewise provided with a releasing-pin $i^{32}$, against which the tail of the pawl $i^{18}$ abuts in order to swing the said pawl and disengage it from the ratchet $i^{17}$. It will be noted that the police or regular key $k'$ (see Fig. 19) is provided with a notch $k$, through which the stop $i^{23}$ on the inner face of the escutcheon-barrel will pass, so that the regular key may be turned until the cam $i^{19}$ comes against the stop or post $i^{31}$. The special key K², Fig. 18, is not provided with the notch $k$, so that it will engage with the stop or pin $i^{23}$, thus preventing the key from being turned more than a certain distance.

I will now proceed to describe the operation of setting the box and trapping the special key, it being remembered that this setting is accomplished by turning the cam-plate to the left in the direction of the hands of a watch, thereby turning also the setting-arbor or main shaft $i^{15}$. This special key, which is shown in Fig. 18, is inserted into the keyhole and turned, carrying with it the cam-plate $i^{14}$. As the cam-plate $i^{14}$ turns the pawl $i^{24}$ will drop behind the teeth $i^{20}$, one after the other, until the pawl $i^{24}$ rests behind the last tooth of the series, when the tail of the pawl $i^{18}$ will come against the pin $i^{32}$ and will be thereby rocked, releasing the winding-arbor and allowing the movement to send in the signal. When the key has reached this position, its further turning is prevented by the projection or stop-pin $i^{23}$, and as the key cannot be turned backward by reason of the fact that the pawl $i^{24}$ rests behind one of the teeth $i^{20}$ it follows that the key is effectively trapped and can be turned neither way until released by other means. The regular key, however, is not subject to this trapping, being, as before explained, provided with a notch $k$, which passes freely over the pin or projection $i^{23}$. When this key is inserted into the keyhole and turned, it will carry the cam-plate $i^{14}$ around in the same manner as the special key did, and, as before, as soon as the pawl $i^{18}$ has been released from its ratchet by the pin $i^{32}$ the signal will be sent in. A further turning of the key, however, will bring the cam $i^{19}$ against the free end of the pawl $i^{24}$ and will rock the same far enough to allow the tail $i^{27}$ of the lever $i^{28}$ to be entered by the spring $i^{33}$ into the notch or recess $i^{26}$ in the said pawl $i^{24}$, thereby maintaining the said pawls $i^{24}$ and $i^{28}$ spread far enough apart to allow the cam $i^{19}$ to return past the free end of the pawl $i^{24}$, thus providing a free passage for the teeth $i^{20}$, which will not be long enough to reach the free end of the pawl $i^{24}$ when the said pawl is caught and held swung outward by the tail of the lever $i^{28}$. This return movement of the key will bring the cam $i^{19}$ against the upper end of the lever $i^{28}$, thereby rocking the said lever on its pivot $i^{29}$ and releasing its tail $i^{27}$ from the notch $i^{26}$ in the pawl $i^{24}$, so that the lever $i^{24}$ will be sprung back by the spring $i^{33}$, which unites the levers or pawls $i^{24}$ and $i^{28}$. This turning of the pawl $i^{24}$ by the regular key also subserves another valuable function, for mounted upon or moving with the pawl $i^{24}$ is a switch-lever $i^{34}$, which coöperates with a spring 10, forming part of a short circuit around the bell or return-signaling magnet P, (see Figs. 2, 4, and 14,) so that as the regular key swings the lever $i^{24}$ it also swings the switch-lever $i^{34}$ off the contact-spring 10, thereby breaking the short circuit around the signaling-magnet P at that point, so that the operator holding the regular key can get an answer back or other call on the bell Q. This lever $i^{34}$ likewise subserves the very valuable function of enabling the holder of the regular key to release the special key from its trap, for mounted upon the lever $i^{34}$ is a button $i^{35}$, which button projects through a slot $i^{36}$ in the front plate A, so that in order to release the special key the holder of the regular key unlocks and swings open the door of the box, the said door being provided with angularly-placed slots for this purpose, and seizing the button $i^{35}$ moves it to the right in the slot $i^{36}$, thereby swinging the lever $i^{24}$ far enough to allow the pawl-tail $i^{27}$ to fall into the notch $i^{26}$, so that the reverse motion of the special key will be unobstructed by reason of the fact that the stop-pawl or lever $i^{24}$ is now out of the path of the teeth $i^{20}$ on the cam-plate $i^{14}$.

The return swing of such cam-plate resets the parts to the position shown in Fig. 14 and permits the withdrawal of the special key.

I have stated that the contact-device D' is adapted to control the operation of the time-stamp magnet by sending an impulse therethrough only upon the return stroke of the armature of the contact device, and that this armature will not make this return stroke until the signal has finished coming over the line. A special apparatus for this purpose is represented in Figs. 25 and 26. In these figures, $d$ is a base-plate upon which magnets $d'$ are carried, being mounted thereon preferably by suitable brackets $d^2$. An armature $d^3$ is located in front of the pole-pieces of the magnets $d'$. This armature $d^3$ is carried upon a swinging yoke or arm $d^4$, which swings upon the pivot or arbor $d^5$. The armature $d^3$ also carries a contact $d^6$ and a pivoted pawl $d^7$. A retracting-spring $d^8$ serves to retract the armature when the magnet is deënergized, and a retracting-spring $d^9$ serves to draw the pawl $d^7$ downward. Turning loosely upon the arbor $d^5$ is a ratchet $d^{10}$, with which the pawl $d^7$ coöperates, which ratchet is joined rigidly to a gear $d^{11}$, which by a train of intermediate gears imparts motion to a scape-wheel $d^{12}$, with which a click $d^{13}$ engages. Pivoted near the magnet $d'$ is a contact-lever $d^{14}$, which forms one terminal of the circuit of the time-stamp magnet, the other terminal thereof being constituted by the contact $d^6$, carried by the armature $d^3$. This pivoted lever $d^{14}$ is provided with a toe $d^{15}$, which is faced with a block of insulating material $d^{16}$. The toe hangs down into the path of movement of the contact $d^6$, so that upon its forward stroke the contact $d^6$ will strike the insulating-block and upon its return stroke will strike the metallic toe $d^{15}$, thereby sending an impulse over the time-stamp-magnet circuit only upon such return stroke. This will occur by reason of the fact that when current first passes through the magnet $d'$ the armature will be drawn up to the pole-piece of such magnet with a quick motion, but will recede from such magnet slowly, because the retractile spring $d^8$ in retracting the armature is obliged to impart movement to the train of gearing, which is rigidly connected to the ratchet $d^{10}$, so that between impulses the armature will not be retracted far enough to bring the contact $d^6$ against the toe $d^{15}$, the resistance of the retarding device or train of gears being proportionately great. Consequently the armature will not be fully retracted by the retractile spring $d^8$ until the impulses of a necessary call have entirely ceased, in which case the retractile spring will carry the armature back to its initial position, and in making such back stroke the armature will contact with the toe $d^{15}$ and send an impulse over the time-stamp-magnet circuit.

As I have before explained, the telephone-line to the central station is or may be a single line employing the signaling-line for the return-circuit.

For the purpose of calling the central and cutting in the telephone I have provided the telephone-switch O, which is clearly shown in Figs. 2, 3, 21, and 22. In these figures, $o$ is a button which projects from the face of the front plate A and is provided with a plunger $o'$ and plug $o^2$ of insulating material. This plug $o^2$ bears against a spring $o^3$, which surrounds the plunger $o'$ and abuts against the insulating-piece O'. This spring serves to assist the inward movement of the plunger. Carried upon the insulating-piece $o^2$ is a conducting-collar $o^4$, which is adapted to bridge across the contact-springs $o^5 o^6$ or $o^7 o^8$. The contact-springs $o^7 o^8$ are of greater length than the contact-springs $o^5 o^6$. The contact-springs $o^5 o^6$ are the terminals of the circuit including the signal-box telephone, whence it will be obvious that by pulling out the plug $o$ the collar $o^4$ will first connect with the springs $o^7 o^8$, forming a direct circuit, and will send a call over the line to central, and further outward movement of the plug $o$ will carry the collar $o^4$ out of engagement with the springs $o^7 o^8$ and bring the collar $o^4$ into engagement with the terminals of the telephone-circuit. This reciprocal action is necessitated by the fact that it is desirable to have the high resistance of the telephone out of the calling-circuit. Projecting from the face or front plate A is another button $r$, which is provided with a plunger $r'$, terminating in an insulating-piece $r^2$, which is adapted to reach contact with a spring $r^4$, which bears upon a contact $r^5$. These parts $r^4$ and $r^5$ are carried upon the insulating-plug O' and with the coöperating push-button $r$ constitute a special calling-key R. Mounted upon the plunger $r'$ is a washer $r^6$, behind which the bolt $s$ of a lock S projects, so that in order to operate the special calling or strap key it is necessary to withdraw the bolt $s$ from behind the washer $r^6$, which withdrawal is accomplished by a key entering a keyhole $r^7$ in the face or front plate A. This lock is so arranged as to permit the withdrawal of the key only when the bolt is in its forward position.

In Figs. 1, 2, 23, and 24 I have illustrated a special form of correcting or short-circuiting key N. This key is shown as consisting of a turn-button $n^2$, having a spindle $n^3$, which passes through a plug of insulating material $n^4$, upon which the contacts $n \ n'$ are mounted. The spindle $n^3$ carries a cross-bar $n^5$, provided with a restoring-spring $n^6$ and adapted to reach contact with the contacts $n \ n'$ to bridge across the same, vibrating between the stops $n^7 \ n^8$. The telephones J K, as explained, are socketed in an aperture in the front plate of the door and may be pulled in and out, being connected with flexible cords or conductors $l$, which are wound upon the spring-reels L M, which pull upon the cords or conductors and hold the said telephones in place in the front plate when they are not in use. The terminals of these cords are connected as follows: One is connected to the reel itself and the other to the plate or disk $l'$ of the reel, upon which a spring $l^2$ bears, which spring is connected to the wire $l^3$ and insulated from the reel. The wire $l^4$ is connected to the reel, so that as the telephone is pulled in and out, revolving the wheel, the circuit will be completed through the telephone-reel and the plate $l'$, which, revolving under the spring $l^2$, maintains its circuit intact.

It will be observed that the mechanism which I have described in detail as an embodiment of my invention is a compact, reliable, and certainly-operating apparatus. It will likewise be observed that the various push-buttons—for instance, the buttons $o$ and $h^{39}$—are in such position as to be pushed in by the closing of the door of the box should the said buttons be left in their pulled-out positions.

What I claim, and desire to secure by Letters Patent, is—

1. In a signaling system, the combination of the following instrumentalities in operative relation, to wit: signal-transmitting mechanism comprising a plurality of signaling devices transmitting a variety of calls, one of said signaling devices transmitting calls comprising short signals, and the other of said signaling devices transmitting calls comprising long signals, a controlling device at the central station arranged to be partially actuated by short signals and fully actuated by long signals, a signal-receiver arranged to respond to a call comprising a plurality of long signals and under the control of the controlling device and operable therefrom when the said controlling device has been fully actuated, whereby calls containing short signals indicate themselves on the controlling device only and calls containing long signals will actuate the controlling device to cause the same to permit the secondary signal-receiver to respond to each long signal.

2. In a signaling system, the combination of the following instrumentalities in operative relation, to wit: signaling mechanism transmitting a plurality of calls, one of said calls comprising short signals, and other of said calls comprising long signals, a controller at a central station, a signal-receiver operated from the said controller at predetermined times, and a governing device for the controller comprising in its structure means for preventing the controller from allowing the signal-receiver to operate during the reception of short signals, and means for manipulating the receiver upon the reception of each long signal of a predetermined class of calls.

3. In a signaling system, the combination of the following instrumentalities in operative relation, to wit: signaling mechanism transmitting a variety of calls, one of said calls comprising short signals, and other of said calls comprising long signals, a controller in the circuit responsive to all signals, a signal-receiver responsive to calls comprising a plurality of long signals, a short circuit around the same under the control of the controller, and a governing device for the said short circuit, whereby the controller will open the short circuit of the signal-receiver at the reception of each long signal of a call containing said long signals of a predetermined character, so that the said signals may manifest themselves in the receiver to cause the said receiver to respond to the said call.

4. In a signaling system, the combination of the following instrumentalities in operative combination, to wit: signaling mechanism transmitting a plurality of calls, said calls comprising long and short signals, a signal-receiving device and a controller at the central station in circuit with each other, each arranged to respond to a call comprising a plurality of signals, a governing mechanism for the controller operating in conjunction with the signal-receiving device, the said governing mechanism being operated by the controller only during the reception of calls containing long signals to permit the signal-receiving device to operate and to respond to each of the said long signals.

5. In a signaling system, the combination of the following instrumentalities in operative relation, to wit: signaling mechanism provided with means for transmitting calls containing long signals and calls containing short signals, a signal-receiving device and a controller therefor operated by the signals, and a short circuit for the said signal-receiving device, a governing device for the said short circuit controlled by the controller and coöperating therewith to break the short circuit of the short-circuited signal-receiving device upon the reception of each long signal so that the normally-short-circuited signal-receiving device will be rendered operative to respond to each call containing long signals at the time of the reception of each of the said long signals of the call, the said controller and short-circuited signal-receiving mechanism operating in unison.

6. In a signaling system, the combination of the following instrumentalities in operative relation, to wit: signaling mechanism provided with means for transmitting a plurality of calls containing long and short signals, a signal-receiving device and a controller therefor, the signal-receiving device comprising in its structure a vibratory part, a governing device operating in conjunction with the controller to govern the operation of the signal-receiving device, the said governing device comprising in its structure a vibratory part executing vibrations of a plurality of amplitudes, and rendering the signaling-receiving device operative only upon its vibrations of great amplitude, whereby the swinging part of the signaling-receiver will vibrate in unison with the vibrating part of the governing device only in its vibrations of great amplitude, and will leave the signal-receiving device unaffected during its vibrations of less amplitude.

7. In a signaling system, the combination of the following instrumentalities in operative relation to wit: a signaling-box provided with means for transmitting a plurality of calls containing signals of different lengths or durations, a controller-magnet, a visual indicator, a governor for the visual indicator under the control of the controller and comprising in its structure a vibrating part, the said controller device being arranged to actuate the governor upon the passage of long signals so that upon receipt of each of the said long signals the vibrating part of the governor and the visual indicator will operate in unison.

8. In a signaling system, the combination of the following instrumentalities in operative relation, to wit: signaling mechanism adapted to transmit a plurality of calls consisting of signals of different lengths, an electromagnetic controller at the central station having an armature adapted to make long and short strokes in response to long and short signals respectively, a signal-receiving instrument at central station provided with a vibrating armature and under the control of the controller and operated therefrom at each long stroke of the armature of the said controller, whereby calls comprising long signals will be indicated at the central station by the armature of one signal-receiving instrument vibrating in unison with the long strokes of the other signal-receiving instrument.

9. In a signal-box, the combination of the following instrumentalities in operative relation, to wit: a normally-short-circuited main signaling-movement, an auxiliary signaling-movement in circuit therewith, a signal-receiving magnet in circuit with the signaling-movement and a short circuit for the signal-receiving magnet and means for breaking the short circuit around the signal-receiving magnet operated from the auxiliary signaling-movement.

10. In a signal-box, the combination of the following instrumentalities in operative relation, to wit: main and auxiliary signaling-movements, a short circuit around the main signaling-movement, a signal-receiving magnet in the line of the main and auxiliary signaling-movements and a short circuit around the signal-receiving magnets controlled by the auxiliary signaling-movement.

11. In a signaling mechanism, the following instrumentalities in operative combination, to wit: a plurality of signal-wheels with driving-gear, a plurality of contact devices each coöperating with a signal-wheel to send a signal, and an automatically-operated switching device connected to the line and adapted to coöperate with one or the other contact device, and means for connecting the switching device first with one contact device and then with the other contact device, whereby first one of the signal-wheels will thereby be connected in circuit with the line and the other cut out, and then the other signal-wheel will be connected in circuit with the line, so that the signal-wheels will send their signals to line successively.

12. In a signaling mechanism, the combination of the following instrumentalities in operative relation to wit: a plurality of signal-wheels with driving-gear, a plurality of contact devices coöperating with the signal-wheels to send a signal, and a switching device arranged for coöperation with one or the other of the contact devices of the signal-wheels, and means for connecting the switching device in circuit first with one contact device and then with the other contact device, whereby the wheels will successively send their signals to line, and means intervening between the driving-gear and the switching device for actuating the said switching device.

13. In a signaling mechanism, the combination of the following instrumentalities in operative relation to wit: a plurality of signal-wheels with driving-gear, a plurality of contact devices coöperating with the signal-wheels to send a signal, and a switching device arranged for coöperation with one or the other of the contact devices of the signal-wheels, and means for connecting the switching device in circuit first with one contact device and then with the other contact device, whereby the wheels will successively send their signals to line, means intervening between the driving-gear and the switching device for actuating the said switching device, and a short-circuiting device for short-circuiting the contact devices.

14. In a signaling mechanism, the combination of the following instrumentalities in operative relation to wit: a plurality of signal-wheels with driving-gear, a plurality of contact devices coöperating with the signal-wheels to send a signal, and a switching device arranged for coöperation with one or the other of the contact devices of the signal-wheels, and means for connecting the switching device in circuit first with one contact device and then with the other contact device, whereby the wheels will successively send their signals to line, means intervening between the driving-gear and the switching device for actuating the said switching device, and a short-circuiting device for short-circuiting the contact devices, and means for actuating the short-circuiting device from the signal-wheel driving-gear.

15. In a signal-box, the combination of a plurality of signal-wheels, and circuit-controllers under control of the signal-wheels, the said circuit-controllers terminating in terminals opposed to each other, a contact normally bearing upon one of the said terminals and adapted when moved to reach contact with the other, and a pivoted arm carrying the said movable contact in operative relation to an arm-swinging device, such as the cam $h^{34}$, substantially as described and for the purposes set forth.

16. In a signaling mechanism, the combination of a plurality of signal-wheels, a plurality of circuit-controllers, a switching device for putting one or the other of the circuit-controllers into the line and a short-circuiting device for short-circuiting the circuit-controllers, said switching and short-circuiting devices being operated from the motor mechanism for the signal-wheels.

17. In a signaling mechanism, the combination of a plurality of signal-wheels, a plurality of circuit-controllers, a switch-lever for putting one or the other of the circuit-controllers into the line and a short-circuiting lever for short-circuiting the circuit-controllers, and a spring connecting the short-circuiting lever and the switch-lever.

18. In a signal-box, the combination of a signaling-movement, winding mechanism for setting the said movement for operation, a releasing mechanism for releasing the movement and means for locking the winding mechanism from being operated when the releasing mechanism has been thrown to release the movement for operation.

19. In a signal mechanism, the combination of a signaling-movement, a winding mechanism for setting the said movement, a releasing mechanism for releasing the movement and means for rendering the winding mechanism inoperative when the releasing mechanism has been actuated to release the movement for operation.

20. In a signal mechanism, the combination of a signaling-movement and setting mechanism for setting the same, a releasing mechanism for releasing the movement for operation after it has been set and means for rendering the setting mechanism inoperative to set the movement while the signal is being transmitted.

21. In a signaling mechanism, the combination with a signal-transmitting movement of a setting mechanism for setting the same for operation, a releasing mechanism for the movement, means for rendering the setting mechanism inoperative when the movement has been put in operation by the releasing mechanism and means for rendering the releasing mechanism inoperative during transmission of the signal.

22. In a signaling mechanism, the combination of a step-by-step setting mechanism combined with a transmitting mechanism and a releasing device for the transmitting mechanism provided with a stop for the step-by-step setting mechanism.

23. In a signaling mechanism, the combination with a signal-transmitting movement, of a setting mechanism for setting the same for operation, a releasing mechanism for releasing the movement and means for rendering the setting mechanism inoperative when the releasing mechanism has been operated and for rendering the releasing mechanism inoperative when the setting mechanism is in operation.

24. In a signaling mechanism, the combination of a signal-transmitting device, winding and releasing mechanisms therefor, and locking means actuated from the releasing mechanism for rendering the winding mechanism inoperative when the releasing mechanism is operated.

25. In a signaling mechanism, the combination of a signal-transmitting device, a setting mechanism therefor, a releasing mechanism, means for rendering the setting mechanism inoperative, the said means being controlled from the releasing mechanism, means for rendering the releasing mechanism inoperative during operating of the setting mechanism, and a locking device for the releasing mechanism, whereby both the releasing and setting mechanisms will be rendered inoperative each during the operation of the other, and both will be rendered inoperative during transmission of a signal.

26. In a signaling mechanism, the combination of a signal-transmitting device having setting and releasing mechanism arranged to reciprocally lock one another from movement and a locking device for one of these elements, whereby both may be held locked at predetermined times.

27. In a signaling mechanism, the combination of a signaling device having a driving-gear, a releasing device for releasing the said driving-gear, a latch for holding the releasing device inoperative during the transmission of a signal, a spring for actuating the said latch and a means for restoring the latch to its initial position against the tension of the spring.

28. In a signaling mechanism, the combination of a signaling device having a driving-gear, a releasing device for the driving-gear, a reciprocating latch for holding the releasing device inoperative during transmission of a signal, a spring for actuating the said latch to bring it into position to lock the releasing device and means for reciprocating the latch to restore the same to its initial position against the tension of the spring.

29. In a signaling-box, the combination of a signaling-movement, a movable releasing device for the said movement, means for locking the said releasing device in the position which it assumes when it has released the movement, means for moving the said releasing device in a direction opposite to its movement to release the box, whereby the said releasing device will be restored to its initial position, and a reciprocating latch for locking the releasing device during transmission of a signal.

30. In a signaling mechanism, the combination of a signal-transmitting device having a driving-gear, a releasing device therefor, a reciprocating latch for locking the releasing device during transmission of the signal, the said reciprocating latch being reciprocated in one direction by a spring and reciprocated in the opposite direction by the action of the driving-gear, whereby the driving-gear of the said signaling mechanism may be released, the releasing device therefor held locked during transmission of the signal by the latch and the said latch restored to its initial position at the completion of the signal by the operation of the driving-gear.

31. In a signaling mechanism, the combination of a signal-transmitting device and its driving-gear, of a setting-lever and a reciprocating releasing-plunger and projections carried upon the lever and plunger for coöperating with each other, each to prevent the operation of the other at predetermined times, whereby the setting-lever and releasing-plunger will be rendered inoperative one from the other.

32. A signal-transmitting mechanism combined with a setting mechanism, comprising a swinging pawl and a ratchet coöperating therewith, the said ratchet being provided with a series of teeth and one tooth of greater length than any of the other teeth.

33. The combination with a signaling device and its driving-train of a releasing mechanism therefor, comprising a plunger, a stop-lever $h^{37}$ carried by the plunger, a pin on the driving-gear coöperating with the stop-lever, a latch on the driving-gear serving to lock the stop-lever, and means for withdrawing the latch by the movement of the driving-gear.

34. In a signaling-box, a releasing mechanism comprising the combination of a plunger, a stop-lever $h^{37}$, a spring for restoring the plunger to its initial position, a latch $h^{46}$, a spring for impelling the latch into the return-path of the stop-lever and means for withdrawing the latch by the movement of the driving-gear of the signal device.

35. In a signal-box, the combination with signal-transmitting mechanism and setting mechanism therefor of a push-rod or plunger carrying a stop or releasing lever for releasing the transmitting mechanism upon movement of the plunger and also a catch-lever $h^{61}$ for locking the setting mechanism while the plunger is out of its normal position.

36. In a signaling mechanism, the combination of a signal-transmitting device provided with a releasing mechanism and a locking mechanism for the releasing mechanism, of a main or setting arbor, a stop-arm on the arbor for coöperating with the releasing mechanism and a lifting-arm on the arbor for coöperating with the locking mechanism.

37. A key-trap comprising a winding-arbor, a stop engaging the key to stop the said key in its rotation, a toothed plate rotated by the key and a pawl engaging the plate to prevent the return movement thereof.

38. In a signaling device, the combination of a winding-arbor, a key-trapping device comprising pawl-and-ratchet mechanism and a locking mechanism for locking the pawl, and means operated by the key for swinging the pawl out of the key-trapping position and engaging the said pawl with a locking device while in such last-named position, whereby the signal may be sent in by a special key which will not be trapped.

39. The combination in a signal-box of a signal-receiving mechanism in the box, a signal-transmitting mechanism and a key-trap coöperating with the signal-receiving mechanism and means for putting the signal-receiving mechanism into circuit by the operation of the key-trap.

40. In a signal mechanism, the combination of a signal-receiving mechanism in the box, a short circuit around the same, a signal-transmitting mechanism combined with a key-trap and circuit-manipulating means actuated by the key-trap for opening the short circuit around the signal-receiving mechanism.

41. In a signaling device, the combination with a winding-arbor of a cam-plate $i^{14}$ moving therewith, a pawl or lever $i^{24}$ coöperating with the cam-plate and a catch-lever $i^{28}$.

42. In a signal-box-key-trapping mechanism, the combination of a key-arresting projection, a plate moving with the key and provided with teeth, a pawl for coöperating with the teeth and means for swinging the pawl out of the return-path of the teeth.

43. In a key-trapping mechanism for a signal-movement, the combination of a key-arresting projection as $i^{23}$, a plate moving with the key and provided with teeth and a cam, a pawl for engaging the teeth on their return movement to lock the plate, thereby trapping the key, and a locking or latch device for the pawl, the said cam coöperating with the pawl and its lock to swing the pawl into its locked position out of the return-path of the teeth and to unlock the pawl after the teeth have passed the said pawl on their return movement, substantially as described.

44. A trapping mechanism for signal-box keys comprising a key-arresting projection, a plate moving with the key, a pawl for locking the plate upon its return movement, a locking device for locking the pawl when it has been moved out of the path of the return movement of the plate and a spring uniting the said pawl and locking device.

45. In a signal-movement, the combination of a key-arresting projection combined with a plate moving freely with the key, a stop-pawl $i^{24}$, a catch-lever $i^{28}$, teeth upon the plate for catching with the stop-pawl $i^{24}$ and a cam upon the plate for rocking the pawl and catch-levers.

46. In a signal-box, the combination of a signal-movement adapted to be set by a key, a trapping mechanism for the key and a lever $i^{34}$ for untrapping or releasing the key from the outside of the front plate of the box.

47. A contact device for time-stamp magnets and the like, comprising a magnet, an armature adapted to manipulate the circuit on its return stroke, means for preventing the armature from manipulating the circuit of the time-stamp on its forward stroke, and a retarding means for retarding the return movement of the armature, whereby at the beginning of a signal the armature will be thereby put in position to actuate the time-stamp circuit, and upon the cessation of the said signal the armature will be retracted and caused to manipulate the said time-stamp circuit, substantially as and for the purposes set forth.

48. In a contact device for time-stamp magnets and the like, the combination with the said time-stamp or other magnet, of a circuit therefor, a magnet, an armature therefor, arranged to manipulate the circuit of the time-stamp magnet upon its return stroke only, means for preventing the said armature from manipulating the circuit of the time-stamp magnet upon its forward stroke, whereby the armature will be attracted to its magnet at the beginning of a signal, a train of gearing for retarding the return movement of the armature during the periods intervening between the receipt of integral parts of the signal, whereby the armature will be retracted to its full degree of retraction only upon the completion of the signal, and will in such return stroke manipulate the circuit of the time-stamp or other magnet, substantially as described and for the purposes set forth.

49. In a contact device for time-stamp magnets and the like, the combination of a magnet, an armature therefor carrying a contact-piece, a contact-lever $d^{14}$ provided with an insulating-block $d^{16}$ to be struck by the contact-piece of the armature on the front stroke thereof and a toe $d^{15}$ in metallic connection with the time-stamp circuit to be struck by the contact-piece of the armature on the back stroke thereof and a retarding device for retarding the back stroke of the armature, whereby the armature-contact will strike the contact-toe $d^{15}$ only upon the cessation of a signal.

50. In a signaling mechanism, the combination of a signaling-movement combined with a strap or calling-key and actuating mechanism therefor comprising a reciprocating plunger adapted to reach contact with the key, combined with a lock therefor having a bolt arranged to engage the plunger to lock the same, from which lock its actuating-key can be withdrawn only when the bolt thereof is in its locking position.

51. A signal-box provided with a plate as A turning upon one of its edges, a plurality of pairs of pins on opposite sides of the box, hook-hinges carried by the swinging plate and cooperating with one or the other of the pairs of pins in their extreme positions.

52. The combination in a telephone-box of a pull-down-hook signal-setting device, a plunger-box-releasing device, a cut-out or short-circuiting key V and a box-door adapted to restore the plunger-box-releasing device to its normal position should it be accidentally left out and to manipulate the cut-out key.

WALTER F. BANKS.

Witnesses:
W. CECIL DURAND,
JOS. GILLET NOYES.